United States Patent [19]
Linhardt et al.

[11] 3,770,048
[45] Nov. 6, 1973

[54] INTEGRATED SYSTEM FOR VAPORIZING CRYOGENIC LIQUIDS

[75] Inventors: Hans A. Linhardt; James A. Kirk, both of Costa Mesa; Raymond E. Lancaster, San Pedro, all of Calif.

[73] Assignee: Airco, Inc., New York, N.Y.

[22] Filed: Dec. 22, 1971

[21] Appl. No.: 210,713

[52] U.S. Cl. .................................. 165/1, 165/39
[51] Int. Cl. ............................................. B60h 1/00
[58] Field of Search .................... 62/52; 165/60, 51, 165/39, 40

[56] References Cited
UNITED STATES PATENTS
3,246,634   4/1966   Stevens ................................. 62/52
3,364,982   1/1968   Jaffe ..................................... 165/60

Primary Examiner—Charles Sukalo
Attorney—Mathews et al.

[57] ABSTRACT

An integrated system for vaporizing cryogenic liquids including a fuel burner for generating hot combustion gases. The gases are directed into a mixing chamber and contacted with a spray of water for producing a heat transfer gas-steam mixture. The mixture is allowed to indirectly heat the cryogenic liquid and condensate formed is recycled for mixing. The firing rate of the burner is controlled in response to the temperature of the gas-steam mixture exhaust.

22 Claims, 7 Drawing Figures

INVENTORS.
H. D. LINHARDT
J. A. KIRK
R. E. LANCASTER
BY *F. B. Henry*
ATTORNEY

FIG. 7

INTEGRATED SYSTEM FOR VAPORIZING CRYOGENIC LIQUIDS

BACKGROUND OF INVENTION

The prior art discloses heat transfer systems of the type wherein a continuous flow of hot gases heats a fluid that is circulated through heat conducting tubes disposed in the path of the hot gases. Systems of this kind have been used in aircraft, for example, wherein hot exhaust gases from a jet engine are used for heating air that is circulated through a heat exchanger. The heated air in turn is used for space heating, air-foil deicing and the like.

It has also been proposed to vaporize cryogenic liquids in a submersion-type heat exchanger wherein one or more fuel burners direct hot exhaust gases at superatmospheric pressure through ducts into a body of water that in turn surrounds heat transfer passages for the circulating cryogenic liquid. In this two-stage arrangement, the water is heated by direct bubbling contact with the hot exhaust gases, and the heated water vaporizes the cryogenic liquid within the heat transfer passages. The two-stage systems are generally installed in large poured concrete tanks which contain the water bath. Such systems are expensive and complicated in assembly and cannot be skid-mounted and easily transported. These systems do, however, provide for moderating the temperature gradient between the hot gases and the cold liquid.

Where hydrocarbon cryogenic liquids, such as LNG (liquified natural gas) or methane, etc. are to be vaporized for piping into commercial storage or distribution lines, this temperature moderating effect referred to above, is not only desirable but is especially important for safe operation. For such liquids, application of excessive heat to the heat transfer surfaces can be hazardous and result in explosions, fires, etc. It is also desirable that the gaseous heat transfer medium have a very low oxygen content for safe operation, as well as for minimizing tube deterioration, etc.

A single-stage heat transfer system utilizing hot combustion gases in combination with water injection for producing a heat transfer medium consisting of a hot mixture of gas and steam for vaporizing cryogenic liquids and the like, is described and claimed in a copending application Ser. No. 880,041, for "Hot Gas Heat Exchanger," filed Nov. 26, 1969 by H. D. Linhardt and assigned to the same assignee as the present invention. The present invention constitutes an improvement on the single-stage system described therein.

As used herein, the term "cryogenic liquid" is intended to mean a liquid, ordinarily a gas at ambient temperature, that requires a temperature materially below the freezing point of water for keeping it in a liquefied state. Typical of such cryogenic liquids are nitrogen, oxygen, natural gas, methane, etc.

SUMMARY OF THE INVENTION

In accordance with the invention an integrated heat transfer plant for vaporizing a cryogenic liquid comprises in a preferred arrangement, a heavy duty industrial fuel type burner equipped with an intake air blower or compressor, a combustion chamber for completing the combustion process and having water injection for steam generation, a heat transfer and vaporizing chamber receiving the gas-steam mixture from the combustion chamber and containing heat conducting tubes for circulating the cryogenic liquid, and a condensate sump with water recovery pump means for recirculating injection water and cooling water, together with controls for achieving efficient and uniformly high rate of vaporization of the cryogenic liquid to a product gas. In one form of the invention, the component units of the plant are compactly mounted on a common base for making up an integrated assembly that can readily be installed.

Practice of the invention comprises essentially feeding compressed air from the blower to the fuel burner for producing large volumes of hot combustion gases; these gases in turn flow into a water cooled combustion chamber for completion of combustion and then cooling by spray water. Water is directed to fogging spray nozzles to create a mist which is thoroughly mixed with the combustion gases to make up a gas-steam mixture. This heat transfer medium is directed into and through the heat transfer and vaporizing chamber containing multiple heat transfer coils or "tube bundles" arranged in a stack, through which flows the cryogenic liquid to be vaporized and superheated. Capacity control for efficient and safe operation is maintained by mutually related modulating and other controls. For example, efficient generation of heat for the vaporization process is achieved by adjusting burner fuel-air feed according to variation in the stack end temperature of the vaporizer; e.g., exhaust gas temperature from a selected reference value; the fuel-air ratio may be subject to control by varying the volume of blower air according to sensed burner oxygen for ensuring near stoichiometric condition. Accordingly, significant oxygen content in the heat transfer mixture is avoided. The temperature of the product gas leaving the vaporizer is also sensed and controlled to avoid wide fluctuations.

A principal object of the invention therefore is an improved heat transfer system for vaporizing cryogenic liquid by a gas-steam mixture, that provides for full capacity control at a high rate of heat transfer together with safe operation at high thermal efficiency.

A related object is a readily installed unit-type vaporizer plant of the character above, including components making up an integrated system that is economical as regards both initial cost and maintenance, and that has a practical minimum of controls.

Other objects, features and advantages will appear from the following description with reference to the accompanying drawings.

DESCRIPTION OF PREFERRED EMBODIMENT

Figures 1, 3:
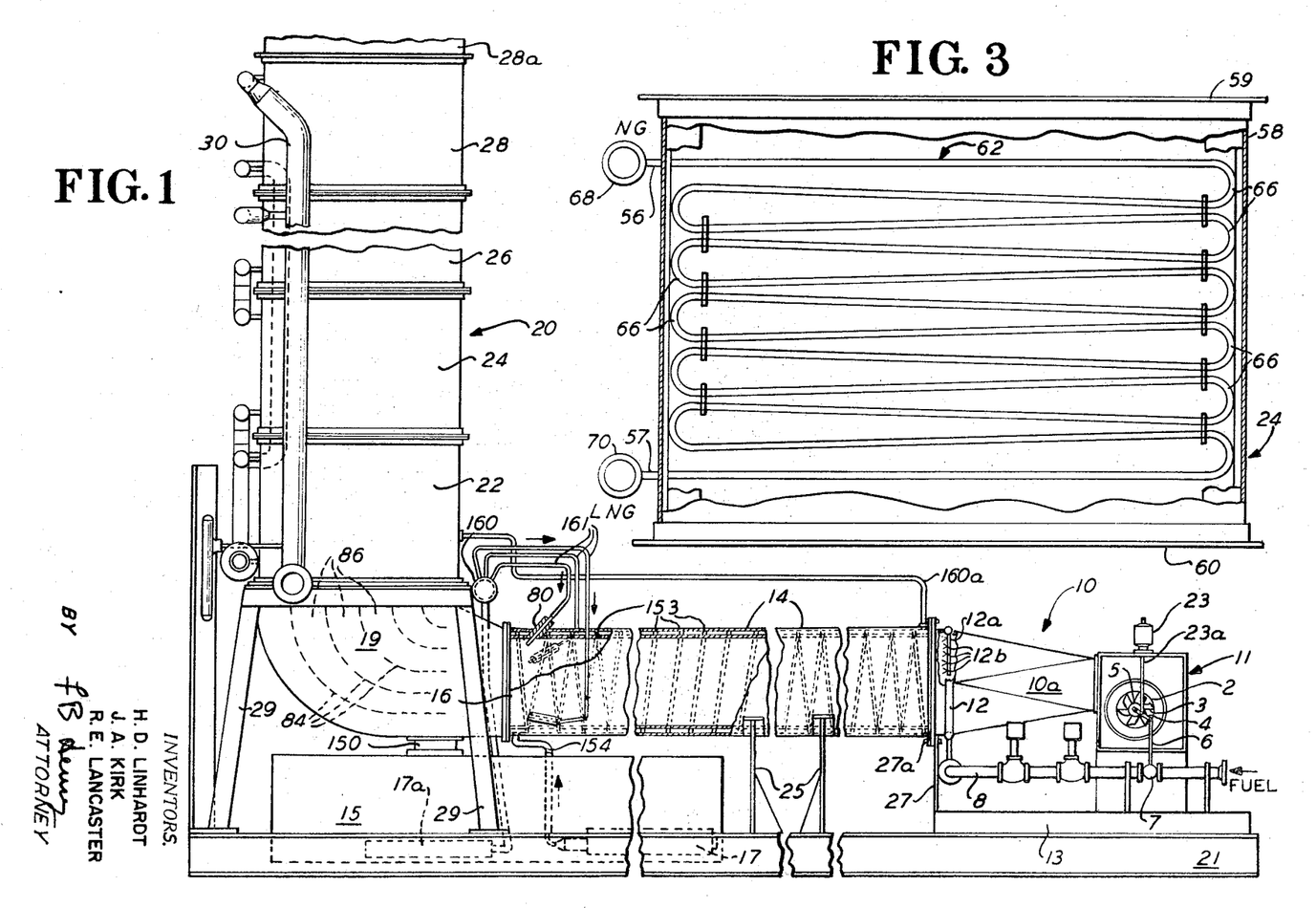
FIG. 1 is a lengthwise view in elevation, broken at several sections for overall illustration, of cryogenic liquid vaporizing apparatus embodying the present invention.
FIG. 3 is an enlarged interior view of one of the heat transfer tube units making up the vaporizer stack, taken as viewed in FIG. 1.
Figures 2, 6:
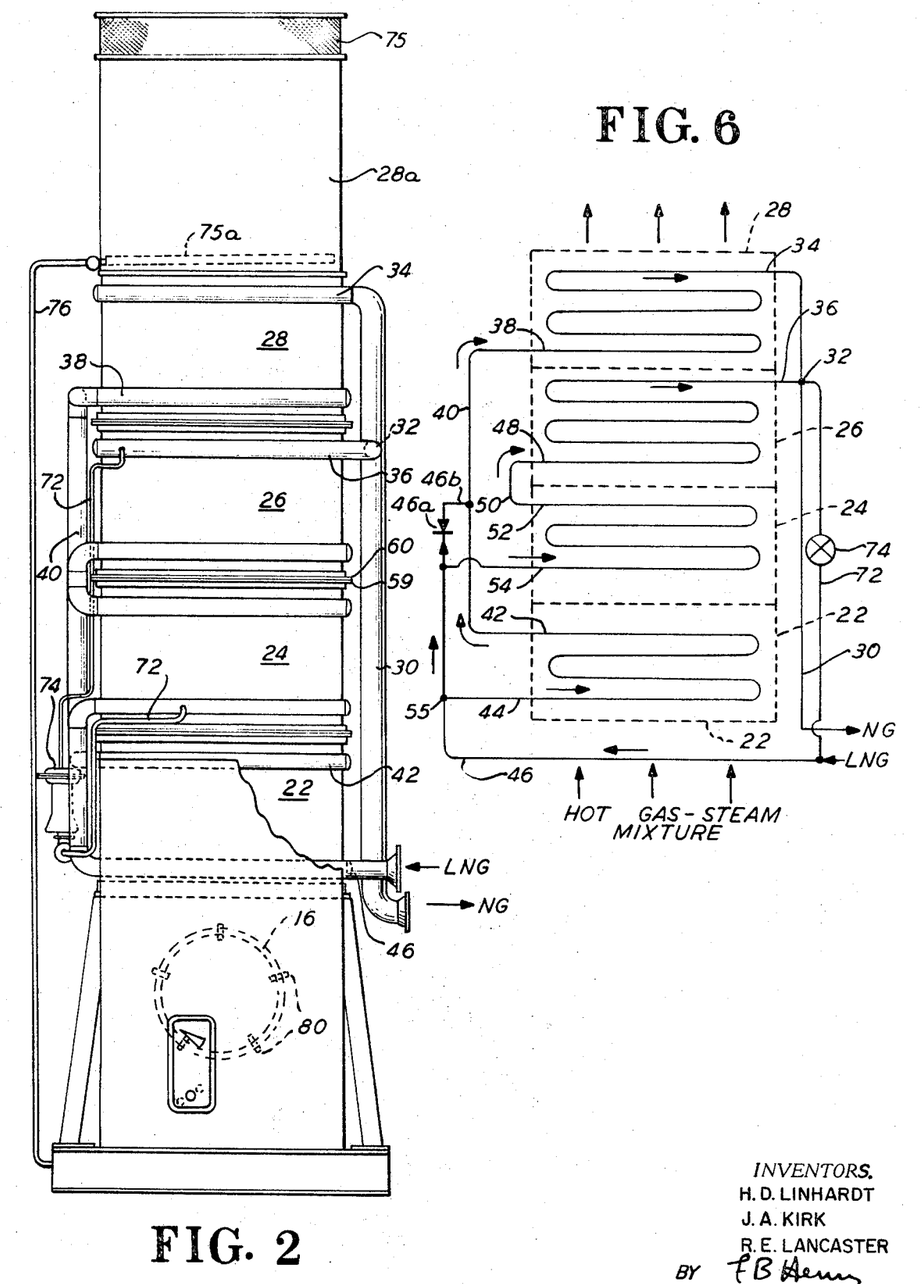
FIG. 2 is an end view of FIG. 1 in elevation showing vaporizer stack unit connections.
FIG. 6 is a schematic diagram of the stacked tube units connected as generally indicated in FIG. 2.

The cryogenic liquid vaporizing apparatus of FIGS. 1 and 2 comprises essentially a heavy duty fuel burner 10, for directing flames and the products of combustion into a long horizontal tunnel-like combustion chamber 14 for obtaining complete combustion of the burner gases, a spray chamber 16 constituting a continuation of the tunnel into which water is injected for generating a gas-steam heat transfer mixture and finally a vaporizing tower or stack 20 constituting a heat exchanger through which the gas-steam mixture from the chamber 16 is directed for vaporizing a cryogenic liquid such as liquefied natural gas. A flow-guide elbow 19 interconnects the spray chamber and stack 20 for directing the gas-steam mixture into the stack. The combustion tunnel is water jacketed for cooling purposes and for recovering heat therefrom.

The vaporizing stack 20 is made up of vertically aligned and inter-connected heat transfer tube units or sections 22, 24, 26 and 28, each unit comprising a tube bundle of multiple coils as diagrammatically represented in FIG. 6 for circulation of the liquid to be vaporized.

The main vaporizer plant as shown in FIGS. 1 and 2 is mounted on a structural steel base 21 that in practice may be positioned on a concrete pad (not shown) for outdoor operation. Auxiliary equipment (fuel-air control, etc.) associated with the burner 10 and blower 11 is generally indicated at 4, 5, 6, 23. Base saddles such as at 25 support the combustion tunnel 14 and permit free movement due to expansion and contraction. Supports 29 serve to maintain the stack in position. The forward end of the burner section 12 is bolted to a flange on the end of the chamber 14. A plate 27 supports the forward end of the burner on a carriage 13, which may be rolled away from the chamber 14. Thus by unbolting the flanged connection 27a, the burner may be rolled back for inspection, repair, etc.

The blower unit 11 includes a motor driven fan (not shown), an air intake 2, controlled by pivotally mounted vanes 3 which are in turn actuated by suitable linkage and gearing 4, 5. Connected to linkage 4 is a further linkage 6 which operates a valve 7 which controls the flow of the fuel (for example natural gas) to the burner 10. The fuel supply is connected to pipe 8. An actuator 23 operates through a linkage 23a to simultaneously vary the air supply and the fuel supply, thereby assuring proper stoichiometric mixing and substantially complete combustion of the fuel. The actuator is preferably operated automatically in response to the temperature of the stack exhaust gases as will be described hereinbelow.

The air blast generated in blower unit 11 passes through an expansion chamber 10a which serves to distribute the air blast uniformly through a plurality of burner nozzles mounted on annular manifold 12. The manifold is fed with a fuel supply from intake line 8. The burner nozzles comprise a plurality of tubes (one of which is shown) extending radially inwardly from the annular manifold. Each tube 12a has a plurality of holes 12b drilled therein, along its length facing downstream whereby fuel is distributed from each tube along its length. This arrangement of fuel supply provides for substantially even distribution of fuel in the air supply and results in substantially complete combustion of the fuel.

Suitable safety shutoff valves are placed in the fuel line 8 for shutting down the fuel supply, such as when the fire eye indicates loss of flame, etc. These safety valve are conventionally required by local codes and will not be described further.

The hot flames of combustion are directed from the area of the ring 12 downstream into a cylindrical, water-cooled combustion chamber 14. The chamber length is of a design such that under maximum desired firing rate conditions the combustion of the fuel will be sustantially fully completed prior to the combustion products reaching the mixing chamber 16 wherein the fogging nozzles are located. The chamber 14 comprises an outer steel cylinder wall and a concentric inner steel cylinder wall.

One or more helical baffles 153 are positioned between the concentric cylindrical walls to direct the cooling water in a helical pattern from one end of the chamber 14 to the other. Water is introduced into the downstream end of the cooling chamber by means of a pipe 154 connected to a motor driven pump 17 located in sump 15. The cooling water flows upstream in a helical pattern. The water passing through the annulus cools the chamber walls and prevents the buckling or deterioration of the walls. The water is heated and a portion of it may in fact be converted into steam. The heated water and/or steam exhausts through a return pipe 160A, or pipes if more than one helix is used, which directs the exhaust to a point approximately one third up in the lower stack unit 22. The exhaust is sprayed into the lower stack unit wherein it is cooled against the tube bundle. The cooled liquid and any condensate may then run down the tube bundle, through elbow 19 and return to the sump 15 via pipe 150. The cooled water may then be recirculated to the chamber 14 by the sump pump 17. Thus the water and steam which has been heated and generated in the cooling passages of chamber 14, is used to warm the cryogenic liquid passing through the tube bundle in unit 22. In order to further protect the interior wall of the inner cylinder of chamber 14, the inner wall may be coated with a refractory material.

Figure 7:
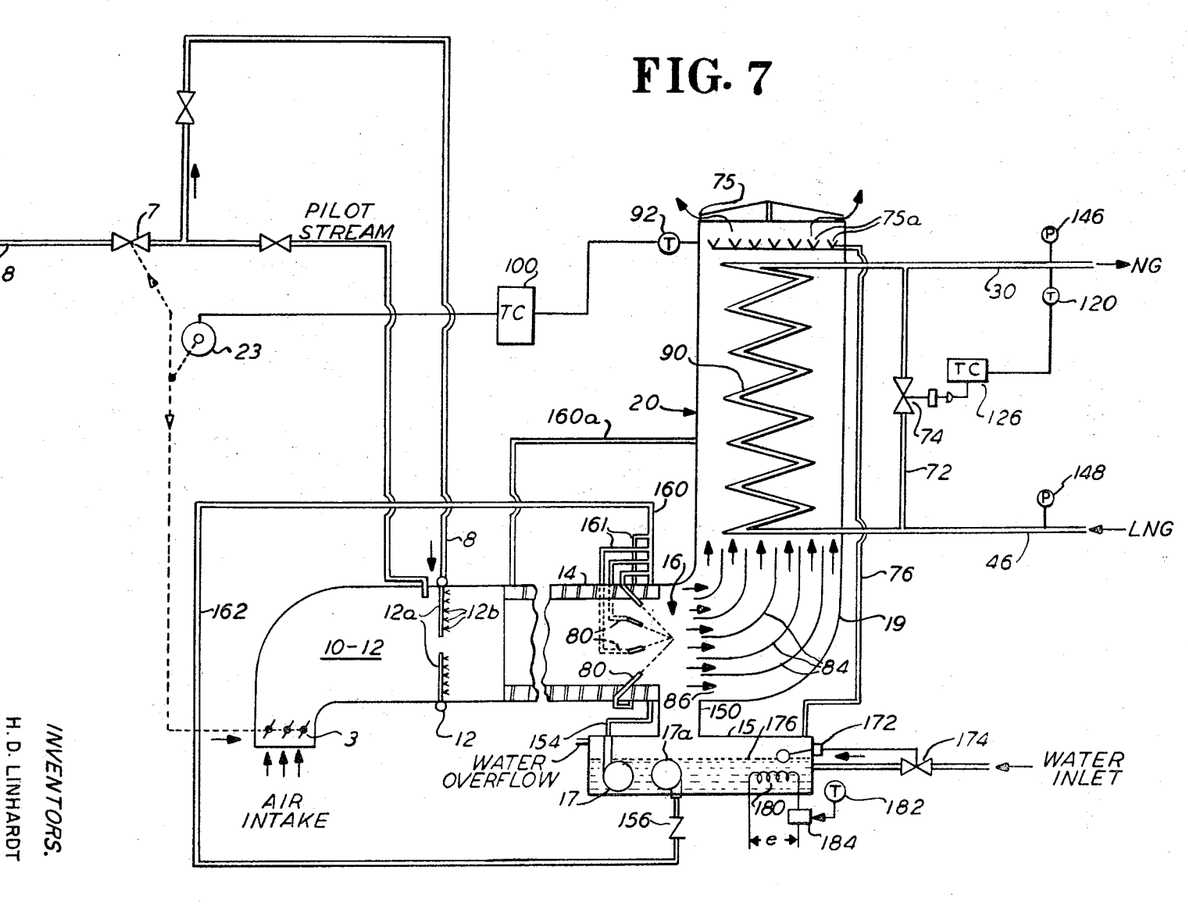
FIG. 7 is a schematic system diagram of a preferred form of the invention.

The water spray or fog is injected into a chamber 16 as jets from peripherally spaced nozzles 80, FIG. 2, that are mounted in the chamber wall so as to direct the individual fogging jets on a downstream angle (about 45°) towards the longitudinal axis of the chamber, FIGS. 1 and 7. The combined jet pattern thus defines a thick cone-like screen of water spray across the chamber through which the combustion tunnel gases are directed for cooling and steam generation. The jet nozzles (five in the present example) are supplied with water under pump pressure from the water sump pump 17a and manifold 160, FIG. 1, to which the respective jet feed pipes 161 are connected in parallel for spraying large quantities of water into the hot combustion gases. Due to the high temperature of the combustion gases, a large part of the water fog is instantly converted into steam; the resulting cooled mixture consisting of the burner gases, steam and water mist flow upwardly through the 90° guidance elbow 19 containing guide vanes 84 into the lower end of the vaporizer stack 20, FIGS. 1 and 7. The vanes are fixed in the elbow for wall-to-wall extension with approximately equal spacing for defining the flow equalizing passages 86. As indicated by direction arrows, the gas-steam mixture is divided by the passages into multiple parallel streams that are approximately equal in cross-section. The gas-steam mixture then passes upward through the stack of tube bundles to cool the fluid that is passing through the tube bundles. The operation and structure of the tube bundles will be described more particularly below.

In order to reduce the amount of water escaping from the top of the stack, a spacer unit 28a is positioned over the top tube bundle. This unit defines a confined opening which permits a swirling or a recirculation of the exhaust gases. The top of the unit 28a is covered by a roof to prevent entry of snow, etc. and enclosed by a screen 75 which tends to prevent particle emissions. The spacer unit 28a also contains a plurality of troughs 75a which are arranged in a horizontal array across the width of the unit 28a. Water vapor condenses on the trough and the water formed therein is directed to a header connecting all the troughs which is in turn connected to a downcomer 76 which leads back to the sump. Thus a portion of the water vapor which would have exited the stack is returned to the sump for reuse.

Referring specifically to the stack arrangement of the cryogenic liquid tubes in FIG. 6, as related to the flow of the vaporizing heat transfer medium, the cyrogenic liquid (such as for example liquefied natural gas (LNG)) to be vaporized is admitted under pressure (such as from a pump) from a source such as conventional storage facilities, to a conduit or inlet main 46 from which the liquid divides at a junction 55 for respective flow into the inlet pipe 44 of unit 22, and the inlet pipe 54 of unit 24. The outlet pipe 42 of unit 22 is connected through an exterior inter-unit pipe 40 with the inlet pipe 38 of unit 28 so that the tube units 22 and 28 are in series flow. The outlet pipe 34 of unit 28 is connected to the product gas outlet main 30.

Similarly, the tube units 26 and 24 are connected in series flow through the outlet pipe 52 of unit 24, inter-unit pipe 50, inlet pipe 48 of unit 26, and outlet pipe 36 of unit 26 that in turn is connected at junction 32 with the outlet pipe 30, to the exhaust main. In order to balance the heat transfer loading in the units 22 and 28, a small amount of liquid is by-passed around unit 22, by directing a quantity of LNG through valve 46a and line 46b into line 40. Thus, the LNG flow is through the vaporizer stack tubes in two separate branch paths connected in parallel, i.e., tube units 28 and 22 make up one branch and units 26 and 24 the other. The parallel arrangement is ideally suited for low pressure applications. For high pressure applications a series arrangement throughout the stack is more appropriate. In this arrangement the flow of the LNG is co-current with the gas-steam mixture as indicated, the two units 26 and 28 constitute the warm heat transfer ends respectively of the parallel branch paths. As these units receive the heat transfer medium at the upper end of the stack, a sufficiently high temperature gradient is maintained for final and complete vaporization of LNG and adequate warming of the product gas within the tubes prior to venting into the outlet main 30. Flow through the tubes may be in counterflow to the hot gases; however, co-current flow has been found best for economy and good control.

Figure 4:
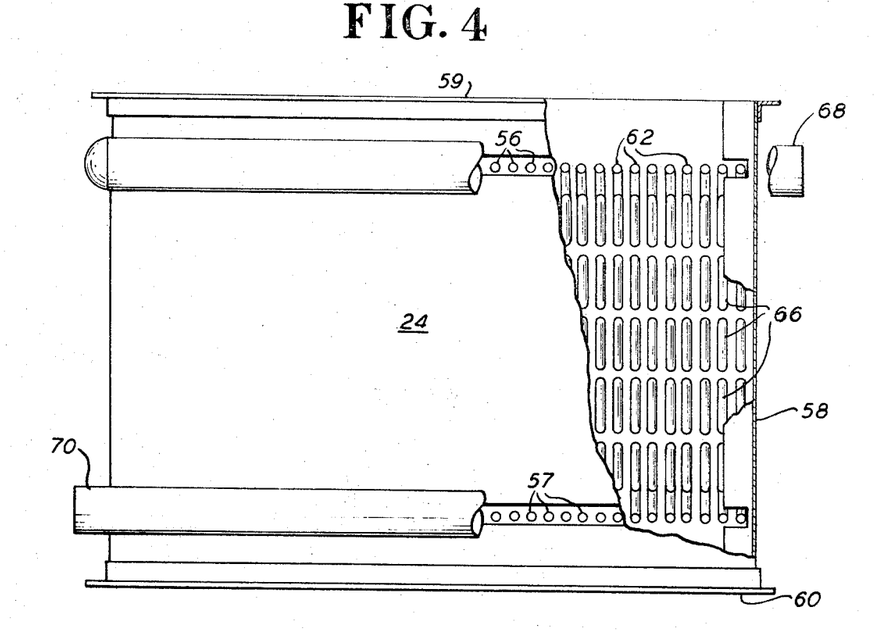
FIGS. 4 and 5 are similar enlarged interior views of the tube unit of FIG. 3, taken as viewed in FIG. 2, and from the top respectively.
Figure 5:
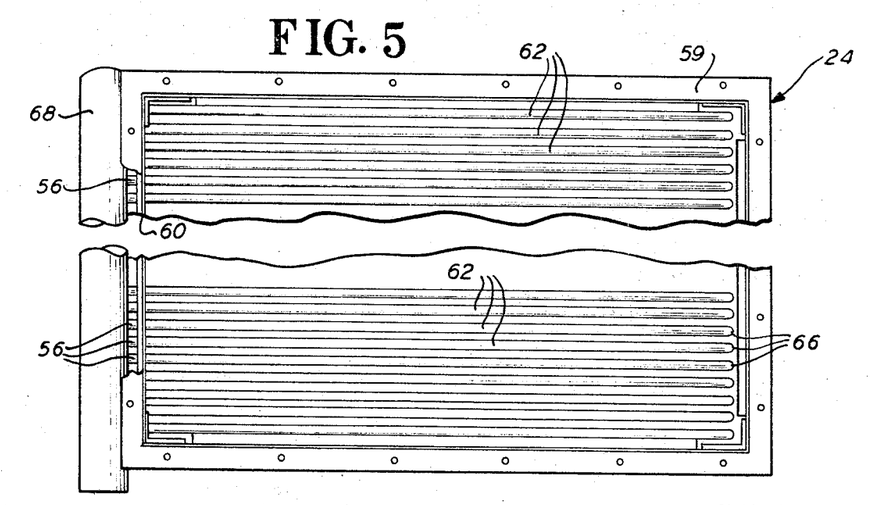

The structural unit arrangement of the tube assembly as shown in FIGS. 3 to 5, lends itself to flexibility in making up as required the vaporization column or stack for plants of varying capacity. Aside from couplings for external connections, each tube unit is substantially the same and comprises, referring to FIG. 3, a suitably prefabricated housing or shell 58 of box-like form open at its upper and lower ends. The housing has coupling flanges 59 and 60 at its open ends for joining with corresponding matching flanges of adjoining stack units. The heat transfer tube bundle within the unit consists of a number of tiers 62 of tube loops, each tier extending generally throughout the height of the unit, the multiple tiers being arranged in parallel, spaced order throughout the width of the unit, FIGS. 4 and 5. The series loops 66 of each tier constitute as best shown in FIG. 3, an individual parallel branch path for LNG flow, thereby further dividing the flow into a large number of parallel paths within a single tube unit. To this end, the lower or inlet loop of each tier is connected at 57 to the supply pipe 70. This pipe may lead from either the LNG inlet main 46, or from the outlet of a preceding unit such as 42 for example. The outlet loop of the tier is connected at 56, FIGS. 3 and 4, to a similarly arranged exterior pipe 68 that may lead to either a series-connected unit or to the product gas outlet main 30.

It will, therefore, be seen that by multiple division of flow within a single unit as described above, the tube diameter in each tier can be correspondingly reduced. Accordingly, there is an advantageous material increase in the ratio of heat transfer area to unit volume of LNG, that in turn makes possible a material increase in rate of heat transfer for rapid vaporization.

For controlling the temperature of the product gas at the outlet main 30 as hereinafter described in more detail, a valve 74 controlled bypass line 72, FIGS. 2 and 6, is connected across the inlet and outlet mains 46 and 30. The bypass valve 74 is controlled according to temperature of the product gas in the outlet main for by-passing some cold LNG into the main 30 to maintain a desired discharge temperature.

The spent gases reaching the top of the vaporizer stack, ordinarily cooled to slightly above ambient temperature, are suitably vented to atmosphere as by a screen-enclosed deflector indicated at 75 after passing through the spacer unit and trough.

The system schematic of FIG. 7 shows control means for achieving stabilized full capacity flow and optimum performance of the vaporizer system throughout a wide range of product gas demand. A primary fuel-air ratio control is jointly applied to the burner fuel and blower air inputs at the unit 10-12 as hereinafter described. The single, heavy duty burner is capable of producing large volumes of hot combustion gases under dependable and efficient combustion conditions. In this type burner, the combustion head provides for a high degree of flame retention under very wide operating load ratios. A conventional ignition system having spark plugs and pilot light may be used wherein the pilot light is shut off by automatic flame detectors after a set starting period. The details of the complete burner starting system, etc. need not be described herein for an adequate understanding of the invention.

Assuming initially, that the burner-blower unit 10-12 is operating at a normally high rate of combustion, the operation generally of the vaporizer plant is as follows. The burner combustion gases are discharged at high velocity through the combustion tunnel 14. The gases during passage through the tunnel are in turbulent flow, thereby enhancing the final combining of remaining oxygen with unburned gases, including carbon monoxide (CO), for the stoichiometric condition set by the burner control. Near the end of the tunnel, where combustion is completed and the gas temperature approaches 3,000° F, water is injected into the gases as they enter the spray chamber 16 for cooling down to a temperature within the range of about 120°-350° F and preferably about 150°-190° F, suitable for stack vaporization of the cryogenic liquid, such as natural gas. During this temperature drop, large quantities of steam are generated.

In the schematic of FIG. 7, the multiple branch heat transfer tube units of the stack 20, FIGS. 3 to 5, are represented for simplicity as a single coil 90, with cold LNG from the inlet pipe 46 passing in co-current flow with respect to the gas-steam mixture for vaporization and final flow as product gas from the outlet main 30. In this arrangement, the temperature of the spent gases and vapors at the top (exhaust) of the stack 20 is an incicator of the rate of heat transfer to the LNG tube bundles for vaporization, i.e., if the stack exhaust temperature is too low, heat transfer and vaporization rates are too low and more burner heat must be added to the gas-steam mixture; conversely, if the stack temperature is too high, fuel is being wasted.

For controlling the temperature of the vaporizing heat transfer mixture, a signal from a temperature indicator or gauge 92 that senses the stack exhaust temperature is transmitted to a temperature controller 100. The output of the temperature controller 100 operates a positioner (which may for example be a pneumatic positioner) 23 which simultaneously modulates the fuel valve 7 and the vanes 3 of the blower.

Where the cryogenic liquid is to be vaporized is a combustible compound such as methane, it is highly desirable that the heat transfer medium be substantially free of oxygen, otherwise an explosion hazard can exist in the event of a leak or accidental damage to the tube bundle. A low oxygen heat transfer medium is also desirable for minimizing corrosion, etc. of the cryogen tubes, fittings, etc. For reducing oxygen in the gas-steam mixture to a practical minimum, the burner fuel-air ratio is adjusted by varying jointly and simultaneously the inputs of fuel and blower air according to an end-temperature condition at the vaporizer stack exhaust.

Although temperature regulation of the stack exhaust gases is also a rough control of the product gas temperature in the outlet main 30, it does not except in a stabilized condition of constant output of the vaporizer, provide adequately close control. For example, where a transient condition exists, such as material change in product demand, there is a definite time lag between a change in flow rate of the incoming cold LNG at inlet main 46 and a responsive change in temperature of the stack gases. This time lag involves the varying response time to fuel feed change, passage of the heat transfer mixture through the tunnel and stack, heat transfer lag, etc. in the stack and other factors.

For maintaining a stabilized condition wherein the outlet product gas temperature is to be held substantially at its norm, i.e., approximately 60° F with a high-low tolerance of about 15° F, within the full range of vaporizer operation from no flow to maximum flow, cold LNG is bled as required from the inlet main 46 through the bypass 72 directly into the outlet main 30. The bypass valve 74 for such control is responsive to a signal from a thermocouple or temperature sensor connected in the outlet main 30 as indicated at 120. The signal is fed to a temperature controller 126 for operating liquid bypass valve 74, according to variation of the sensed signal from the reference norm, i.e., 60° F. A pneumatic actuator may be used to operate valve 74.

In practice, the LNG inlet pressure may be up to 1,200 psig; the inlet temperature is about −255° F. The pressure drop throughout the vaporizer tubes is typically about 50 psig. Pressures in the inlet and outlet mains are monitored respectively, by indicators or gauges 148 and 146.

Accordingly, the product gas temperature control as described above is independent of and superimposed as a fine control on the main burner control for insuring that the outlet temperature of the product gas is kept within the accepted limits mentioned above. The main burner fuel control, on the other hand, is comparatively coarse control based on a temperature signal from the thermocouple or sensor 92 at the stack exhaust.

The hot gas-steam mixture causes a high rate of heat transfer as the gases pass upward and into heat exchange contact with the cold cryogen tubes. Any condensate formed will flow by gravity through the elbow 19 and sump inlet 150 and collect in the sump 15. The sump condensate (plus make-up water required due to loss of some moisture in the stack exhaust gases) constitutes the source of the spray water for steam generation. The sump pump 17a discharges condensate at substantially constant pressure through a pipe 162 with check valve 156, into the manifold 160. The make-up water supply is controlled in conventional manner by a float operator indicated at 172 for controlling the water inlet valve 174 so as to maintain the sump water level 176 substantially constant. The temperature of the sump water is also subject to control depending on different operating conditions. For outdoor operation in cold weather, it may be necessary to supply additional heat to the condensate for preventing freezing of the exterior lines 154, 162, etc. For this purpose, suitable means such as an electric heater 180 is positioned within the condensate and is energized in response to a signal from a temperature sensor 182 for switching the heater on or off at 184.

Other auxiliary system controls may be initiated in conventional manner for starting, emergency venting, and plant shutdown, etc., in response for example to any significant irregularity or malfunction. Since these controls are in general ordinary protective or backup arrangements, detailed descriptions thereof are not necessary for adequate understanding of the invention, other than to mention factors subject to monitoring for possible shutdown and inspection, such as burner flame failure, low (or high) fuel gas pressure, low blower pressure (sensor not shown), high temperature of mixture discharge from the spray chamber, and low air pressure for by-pass valve operation.

Performance specifications for a typical LNG vaporizing plant embodying the invention include the following:

BURNER AND GAS-STEAM HEAT TRANSFER MIXTURE

Natural gas fuel: 12,000–120,000 SCFH
Mixture temperature at stack entrance: 150°–190° F
Heat transferred to LNG: 10–100 × $10^6$ Btu/hr.
Oxygen content, stack gases: About two percent

PROCESS

LNG inlet pressure: 300 psig
LNG inlet temperature: $-225°$ F
NG outlet pressure: 250 psig
NG outlet temperature: $60°\pm 15°$ F
Flow rate of process: $15-125 \times 10^6$ SCFD The vaporizing plant also has a high degree of flexibility such that the time required from first notice of demand (at start) to full flow of product gas is but 5 minutes. In addition, the efficiency of the vaporizing system is normally high due to the specific multipassage arrangement of the tube bundles in parallel flow to the gas-steam mixture for obtaining high rates of heat transfer. With this arrangement, best shown in FIG. 6, the initially hot gas-steam mixture contacting the lower tubes prevents excess freezing of condensate on the cold tube surfaces; the stack exhaust gases are cooled to about $110°-170°$ F and preferably about $130°-140°$ F.

Although the tube bundles are conveniently arranged in a vertical array, they may also be arranged in a horizontal array or in any other array which would permit the exhaust gases to pass over them conveniently and which would permit water collection.

In brief, the disclosed embodiments of the invention make use of steam which is generated and recondensed within the system, as a material component of the heat transfer mixture. The gas-steam mixture as used herein makes possible a high rate of vaporization of the cryogenic liquid, while protecting the tubes and liquid therein from excessively high temperatures, especially during low flow demand. Thus, safety of operation over wide ranges of flow demand is provided, together with the excellent heat transfer characteristics of condensing steam.

Although the above description of the invention clearly reflects that it is appropriately suited for use in vaporizing cryogenic liquid, it may also be used for heating other process fluids. The types of fuel used in the burner will, of course, be dependent on what is available at the location of the vaporizer. In cases where natural gas is to be vaporized, then natural gas will probably also be used as a fuel, since it is readily available at low cost. If economic conditions dictate, fuel oil or any other low cost fuel could be used.

Having set forth the invention in what is considered to be the best embodiments thereof, it will be understood that changes may be made in the system and apparatus as above set forth without departing from the spirit of the invention or exceeding the scope thereof as defined in the following claims.

We claim:

1. A heat transfer system for vaporizing cryogenic liquid to a product gas comprising, a fuel burner and air blower combination for producing large volumes of hot combustion gases, a combustion chamber into which the combustion gases are directed for completing combustion thereof, means for injecting water spray into the gases after substantially complete combustion for vaporizing the water and producing a gas-steam heat transfer mixture, a heat exchanger through which the gas-steam mixture from the combustion chamber is directed having passages for circulation of the cryogenic liquid, the heat transfer mixture being in direct heat exchange contact with the cryogenic passages for vaporizing the liquid to a product gas, means for sensing the temperature of the heat transfer mixture leaving the exchanger, and means responsive to the temperature sensing means for controlling the firing rate of the burner-blower combination to regulate the temperature of the product gas leaving the exchanger passages.

2. A heat transfer system as set forth in claim 1 wherein the combustion chamber comprises an elongated cylinder of double-walled construction to form an annular cooling passage around the chamber, the outer of said walls having ports providing for the admission and exhaust of passage cooling water.

3. A heat transfer system as set forth in claim 2 further including helical baffle means between the walls of said cylinder to channel the cooling water flow in a helical pattern.

4. A heat transfer system as set forth in claim 1 wherein the heat exchanger comprises a plurality of tube bundles arranged in a vertical stacked array, said combustion chamber directing said heat transfer mixture into the lower of said tube bundles whereby the mixture passes up through the vertical array.

5. A heat transfer system as set forth in claim 4 including means to direct the cryogenic fluid flow through said tube bundles in co-current flow relationship with respect to the heat transfer mixture.

6. A heat transfer system as set forth in claim 4 including sump means to collect liquid condensed on said tube bundles for reuse, and further means to trap water leaving the heat exchanger and return the same to the sump means.

7. A system as set forth in claim 1 including means to cool said combustion chamber walls with a flow of cooling water and then inject the resulting heated water into heat transfer contact with passages of the exchanger.

8. A system as set forth in claim 1 including means to sense the temperature of the product gas leaving the heat exchanger passages, means responsive to said gas temperature sensing means to cause cryogenic liquid to bypass exchanger passages and be admitted to the gas flow leaving the exchanger for further regulating the temperature of said product gas.

9. A system as set forth in claim 1 wherein the water injecting means comprises a plurality of nozzles angularly arranged in an annular array to direct a fogging spray in a generally conical pattern into the hot combustion gases.

10. A system as set forth in claim 1 wherein the fuel burner and air blower combination are removably connected as a unit to one end of the combustion chamber and wherein the water injecting means is located at the heat exchanger end of the combustion chamber.

11. A system as set forth in claim 4 wherein at least four tube bundles are vertically stacked and conduit means connects pairs of said bundles to create parallel flow of the liquid in said pairs.

12. A system as set forth in claim 4 including a 90° guidance elbow connecting said combustion chamber and said vertical stack, baffle means in said elbow to direct the heat transfer mixture uniformly from a horizontal flow to a vertical flow.

13. A system as set forth in claim 4 wherein the combustion chamber is an elongated cylinder and saddle means support the cylinder to permit free longitudinal movement thereof caused by expansion and contraction resulting from temperature change.

14. A system as set forth in claim 6 including means to adjust the temperature of the water in the sump means.

15. A system as set forth in claim 1 wherein the fuel burner comprises an annular manifold means, a plurality of injection tubes extending radially inwardly from said manifold means, a plurality of ports in each of said tubes to permit the exhaust of fuel therefrom, means to supply the manifold means with fuel, said air blower positioned upstream of said burner to direct a flow of air across said tubes, and said mixture temperature responsive means controlling the fuel supply to the manifold means and the air supply to the air blower.

16. A heat transfer system for heating a fluid comprising a fuel combustion unit for producing large volumes of hot combustion gases, an elongated tunnel through which the gases are directed for completing combustion thereof, means at the discharge end of the tunnel for injecting water spray into the hot combustion gases for producing a gas-steam heat transfer mixture, a heat exchanger tower having a plurality of tube bundles through which the fluid is circulated for heating, means for directing the gas-steam mixture from the tunnel in substantially uniform cross-sectional flow into the tower and into heat exchange contact with the tube bundles for heating the fluid.

17. A method of vaporizing a cryogenic liquid comprising, producing large volumes of hot combustion gases, reducing the temperature of the hot combustion gases by contacting said gases with a fogging spray of water whereby a substantial portion of the water spray is vaporized and the temperature of the resulting combustion gas-steam mixture is reduced to within the range of from about 120°–350° F, directing said gas-steam mixture to a heat exchanger containing a plurality of tube coils arranged in a vertical array, maintaining a flow of cryogenic liquid to said coils, passing said gas-steam mixture upward through said coils to heat the cryogenic liquid therein, and controlling the temperature of the cryogenic vapor leaving the coils according to the temperature of the mixture leaving the exchanger.

18. A method as defined in claim 17 including sensing the exhaust temperature of the mixture exiting the heat exchanger and controlling the production of the hot combustion gases in response thereto to maintain the exhaust temperature within the range of from about 110°–170° F.

19. A method as defined in claim 17 including regulating the temperature of the vaporized cryogen exhaust leaving the exchanger by introducing cryogenic liquid into the exhaust in amounts necessary to maintain a desired temperature level.

20. A method as defined in claim 18 including producing said hot combustion gases by burning a fuel in the presence of oxygen, controlling the amount of fuel and oxygen supplied so as to fully burn the fuel and leave substantially no uncombined oxygen.

21. A method as defined in claim 17 wherein the temperature of the gas-steam mixture is reduced to about 150°–190° F.

22. A method as defined in claim 18 wherein the said exhaust temperature is maintained within the range of from about 130°–140° F.

* * * * *